United States Patent
Liao

(10) Patent No.: US 11,521,277 B2
(45) Date of Patent: *Dec. 6, 2022

(54) SYSTEM FOR SERVING SHARED CONTENT ON A VIDEO SHARING WEB SITE

(71) Applicant: GOOGLE LLC, Mountain View, CA (US)

(72) Inventor: Tawei Liao, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/080,696

(22) Filed: Oct. 26, 2020

(65) Prior Publication Data
US 2021/0042855 A1    Feb. 11, 2021

Related U.S. Application Data

(63) Continuation of application No. 13/790,562, filed on Mar. 8, 2013, now Pat. No. 10,817,959.

(51) Int. Cl.
*G06Q 50/00* (2012.01)
*G06F 16/438* (2019.01)

(52) U.S. Cl.
CPC ......... *G06Q 50/01* (2013.01); *G06F 16/4393* (2019.01)

(58) Field of Classification Search
CPC ...... G06Q 30/0207–0277; G06Q 50/01; G06F 16/4393
See application file for complete search history.

(56) References Cited

U.S. PATENT DOCUMENTS

| | | | |
|---|---|---|---|
| 2006/0143236 A1 | 6/2006 | Wu | |
| 2006/0210175 A1 | 9/2006 | Huang et al. | |
| 2006/0242661 A1* | 10/2006 | Bodlaender | G06F 16/437 725/9 |
| 2007/0174866 A1* | 7/2007 | Brown | H04N 7/17318 348/E7.071 |
| 2007/0203911 A1 | 8/2007 | Chiu | |
| 2007/0233743 A1 | 10/2007 | Rosenberg | |
| 2010/0274666 A1 | 10/2010 | Wilf et al. | |
| 2012/0084813 A1 | 4/2012 | Dmitriev et al. | |
| 2012/0284744 A1 | 11/2012 | Kumar | |
| 2013/0339877 A1* | 12/2013 | Skeen | G06F 3/0484 707/754 |

OTHER PUBLICATIONS

Final Office Action for U.S. Appl. No. 13/790,562 dated Jul. 13, 2018 (17 pages).

(Continued)

*Primary Examiner* — Chinyere Mpamugo
(74) *Attorney, Agent, or Firm* — Marshall, Gerstein & Borun LLP

(57) ABSTRACT

A method for serving an audio-only shared content on a video sharing web site, including: receiving a playlist listing a plurality of videos; determining a content identification (content-id) for the plurality of the videos in the playlist; determining that the content-id for the plurality of videos corresponds to an audio-related category; selecting audio-only shared content based on the determination that the content-id corresponds to the audio-related category; and inserting the audio-only shared content between two of the plurality of videos.

19 Claims, 4 Drawing Sheets

(56) References Cited

OTHER PUBLICATIONS

Final Office Action for U.S. Appl. No. 13/790,562 dated Sep. 10, 2019 (17 pages).
Non-Final Office Action for U.S. Appl. No. 13/790,562 dated Jan. 30, 2020 (17 pages).
Non-Final Office Action for U.S. Appl. No. 13/790,562 dated Dec. 31, 2018 (17 pages).
Non-Final Office Action for U.S. Appl. No. 13/790,562 dated Jan. 10, 2018 (18 pages).
Notice of Allowance for U.S. Appl. No. 13/790,562 dated Jun. 23, 2020 (12 pages).

* cited by examiner

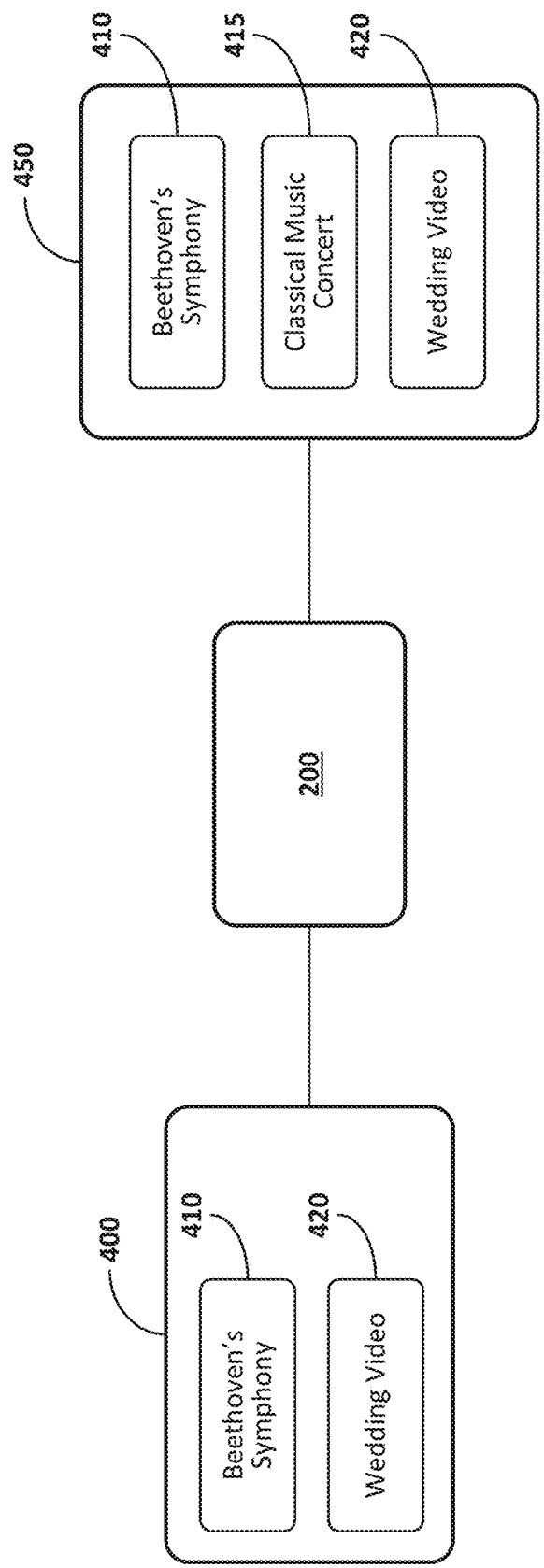

SYSTEM FOR SERVING SHARED CONTENT ON A VIDEO SHARING WEB SITE

CROSS-REFERENCE TO RELATED APPLICATION

This application claims the benefit of priority under 35 U.S.C. 120 as a continuation of U.S. patent application Ser. No. 13/790,562, entitled "System for Serving Shared Content on a Video Sharing Web Site," filed Mar. 8, 2013, which is hereby incorporated by reference in its entirety.

BACKGROUND

A video sharing web site allows users to distribute, index and consume videos sourced from other users via the Internet. Thus, one user may upload a video, while another user may consume the video. The video sharing web site stores the video, while providing an interface for users to upload, search for and view the video.

A user may generate a video, and upload the video for other users to view. In certain cases, the user may want to edit the video by adding authorized content from other sources. Authorized content refers to a media item, such as audio owned by a publisher or owner of the rights to the audio, in which the publisher or owner has given permission to include as part of a user-created video. Additionally, videos may be sourced from the video sharing web site, or from a third-party content provider.

Often times, authorized content such as a popular song, may be associated with a user-created or chosen video. For example, a user may employ a popular song to be distributed over a video of the user's wedding. Thus, when another user searches for the popular song, the other user may be directed to the user-created video of their wedding. The video sharing web site may employ a content identification technique (content-id) to determine that the audio associated with the user-created video is sourced from the popular song. Similarly, the video sharing web site may employ a similar process for determining if remixes or altered forms of the popular song also are incorporated as part of the user-created video.

A video viewer may select certain videos stored on the video sharing web site, and request that the videos be played in succession. The selected videos may be referred collectively as a playlist. The playlist may be wholly created by the video viewer, or alternatively or in addition to, created by an automatic selection process employed by the video sharing web site. For example, the video sharing web site may ascertain that the video viewer enjoys a specific genre of music. The video sharing web site then may automatically retrieve videos related to the specific genre, and auto-populate the playlist.

Certain users may create a playlist for mainly audio listening purposes. For example, a restaurant owner may select videos to create a playlist. The playlist may then be reproduced over a sound system at the restaurant owner's location. As a result, video content associated with the selected videos may be wholly ignored or irrelevant to the restaurant owner's playlist consumption.

DESCRIPTION OF THE DRAWINGS

The detailed description refers to the following drawings, in which like numerals refer to like items, and in which:

FIG. 4 illustrates an example transformation of a playlist according to the method described in FIG. 3.

DETAILED DESCRIPTION

Figure 1:
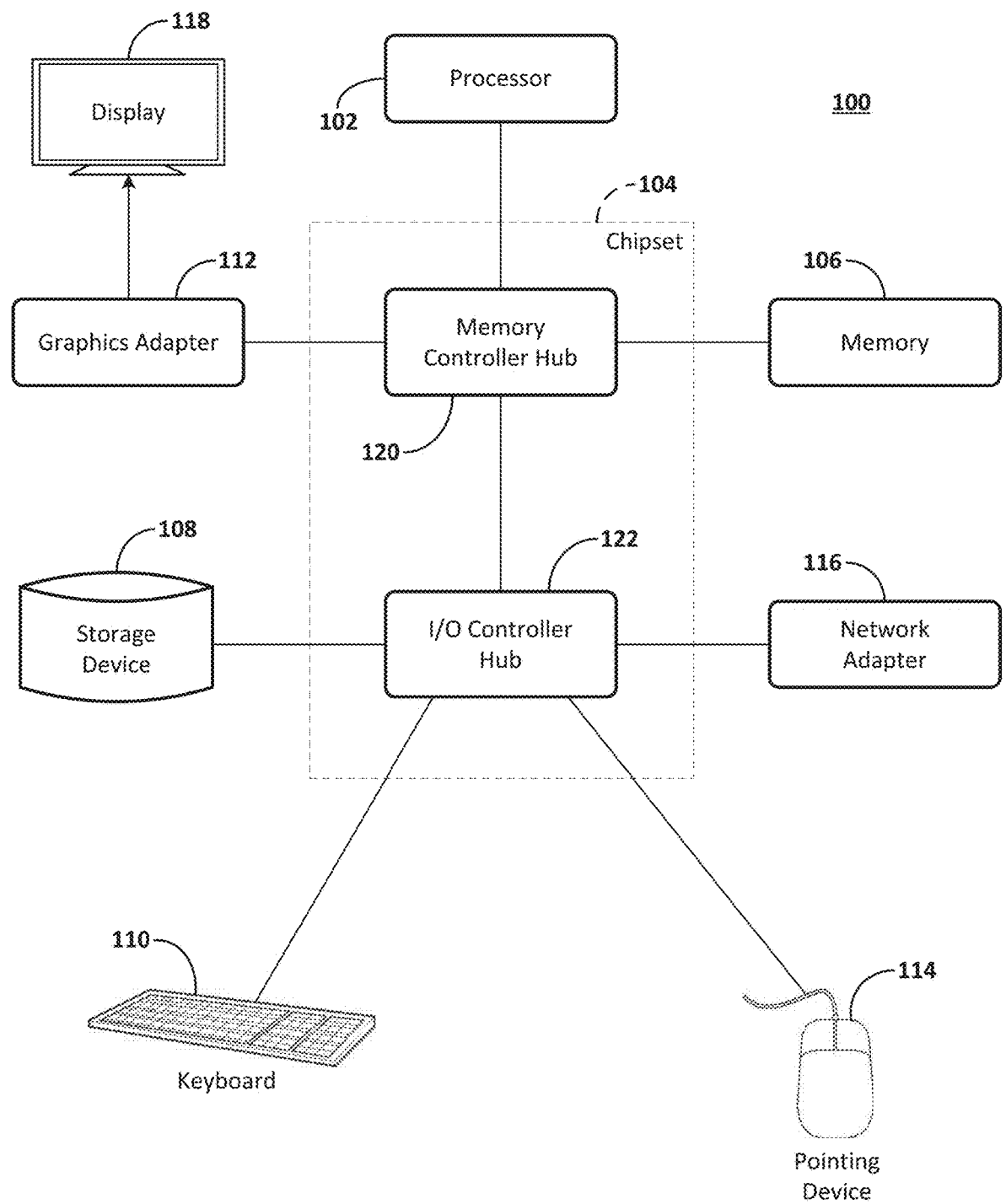
FIG. 1 is a block diagram illustrating an example computer.

A video sharing web site distributes videos over the Internet to various users. The videos may have both visual and audio components, and some users, depending on their preferences, may be interested in only visual components, or only the audio components. A user not viewing the video may not experience certain visual cues contained in video. Thus, if a user uses the video sharing web site primarily for listening purposes, the user may fail to experience all the information conveyed via shared content distributed along with the video.

Disclosed herein are examples of methods and systems for serving shared content based on a playlist sourced from a video sharing web site. The methods and systems disclosed herein employ a concept of analyzing a playlist, determining the content associated with the playlist, and serving shared content based on the analysis. By employing the methods and systems disclosed herein, the video sharing web site may ensure that shared content that is effective at disseminating information to specific users is directed to users of the video sharing web site.

For example, where a restaurant owner creates a playlist, mainly for distributing the audio associated with the playlist items, a video sharing web site may determine that the playlist is used primarily for audio-only purposes. Thus, the video sharing web site may be programmed to analyze the content associated with the playlist and choose an audio-only shared content to be interested in between various playlist items. In this way, a video sharing web site may employ effective shared content for disseminating information based on the playlist being primarily listened to.

Further, by utilizing content-id in performing the analysis of the playlist, the video sharing web site may be more effective at analyzing the playlist to ensure that it is being consumed primarily for its audio content. For example, if a user selects two videos, a song from a popular artist and a user-created video that employs another song from the same artist, by utilizing content-id, the video sharing web site may determine that the playlist is focused on content from the popular artist. Thus, audio-only shared content may be directed to the user based on the shared content being related to the popular artist.

In situations in which the systems discussed herein collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

FIG. 1 is a diagram illustrating an example computer 100. The computer 100 includes at least one processor 102 coupled to a chipset 104. The chipset 104 includes a memory controller hub 120 and an input/output (I/O) controller hub 122. A memory 106 and a graphics adapter 112 are coupled to the memory controller hub 120, and a display 118 is coupled to the graphics adapter 112. A storage device 108, keyboard 110, pointing device 114, and network adapter 116 are coupled to the I/O controller hub 122. Other embodiments of the computer 100 may have different architectures.

The storage device 108 is a non-transitory computer-readable storage medium such as a hard drive, compact disk read-only memory (CD-ROM), DVD, or a solid-state memory device. The memory 106 holds instructions and data used by the processor 102. The pointing device 114 is a mouse, track ball, or other type of pointing device, and is used in combination with the keyboard 110 to input data into the computer system 100. The graphics adapter 112 displays images and other information on the display 118. The network adapter 116 couples the computer system 100 to one or more computer networks.

The computer 100 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 108, loaded into the memory 106, and executed by the processor 102.

The types of computers used by the entities and processes disclosed herein can vary depending upon the embodiment and the processing power required by the entity. The computer 100 may be a mobile device, tablet, smartphone or any sort of computing element with the above-listed elements. For example, a video corpus, such as a hard disk, solid state memory or storage device, might be stored in a distributed database system comprising multiple blade servers working together to provide the functionality described herein. The computer 100 may be implemented without some of the components described above, such as keyboards 110, graphics adapters 112, and displays 118.

Figure 2:
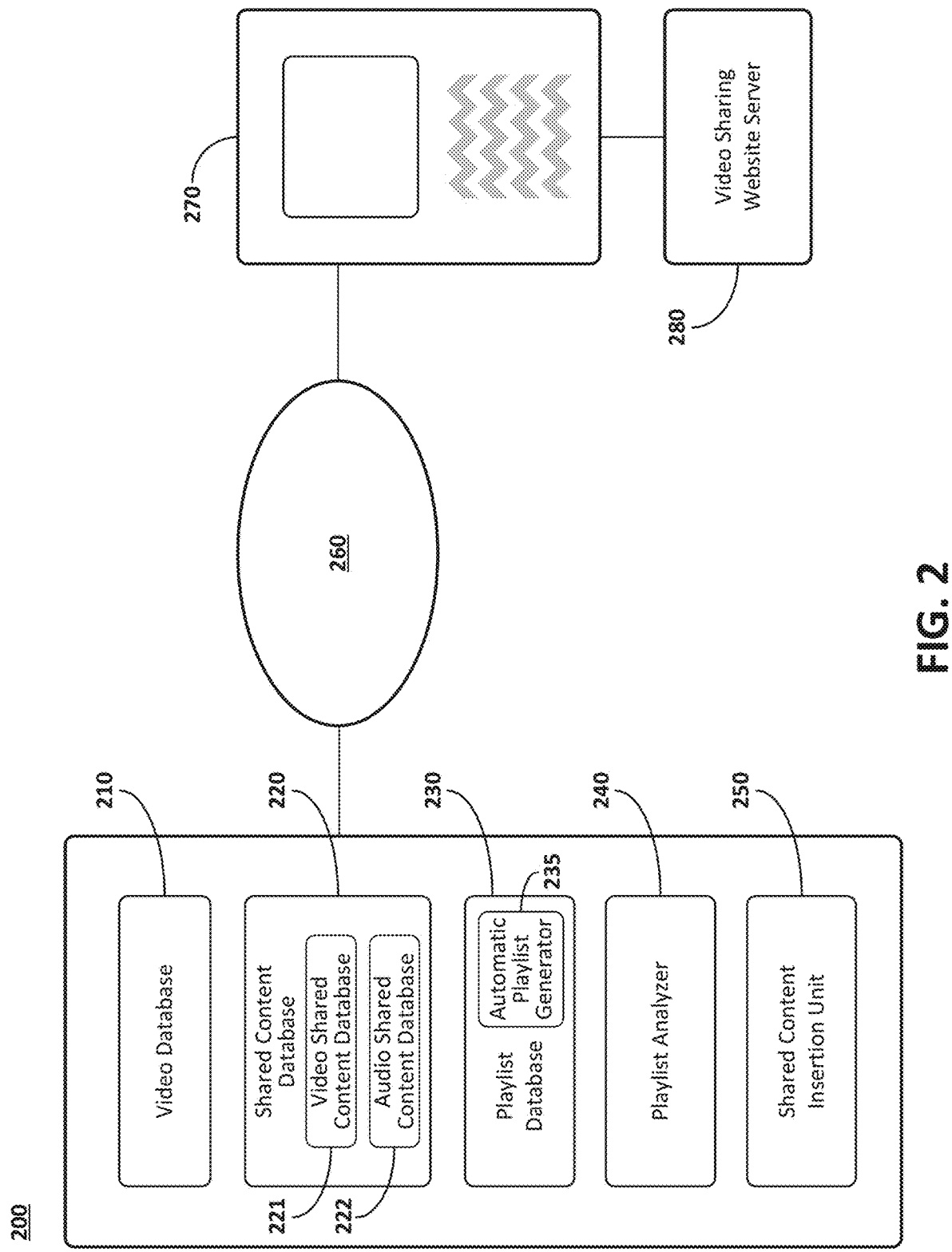
FIG. 2 illustrates an example of a system for serving shared content on a video sharing web site.

FIG. 2 illustrates an example system for serving shared content on a video sharing web site 200. The system 200 may be implemented on the computer 100 of FIG. 1. The system 200 includes a video database 210, a shared content database 220, a playlist database 230, a playlist analyzer 240, and shared content insertion unit 250. As illustrated in FIG. 2, the system 200 communicates via network 260 to a video sharing web site 270. The video sharing web site 270 may be stored on a video sharing web site server 280. Alternatively, the system 200 may be implemented on the video sharing web site server 280.

The video database 210 stores various videos that are received from the video sharing web site 270. The videos may be sourced from the video sharing web site 270 users, the video sharing web site 270 itself, or third-party partners. The videos may range in subject matter from professionally produced videos (i.e. a movie trailers, music videos, for example) to those that are personal in nature (i.e. wedding videos, children's birthday parties, school recitals, for example).

In certain cases, personal videos may employ audio or other shared content from other sources. For example, a music label may authorize that a song it owns be employed in personal videos. Thus, if authorized, a user may overlay a personal video with the authorized song. In this way, a user is given control to enhance the user's video with authorized content.

Additionally, users may remix or present the original content in a different way. Users may mix multiple songs or content items into a single video. Once again, the video sharing web site 270 allows a user to use original content only when the original owner of the content being remixed or altered has given express authorization to do so.

The shared content database 220 includes a video shared content database 221 and an audio shared content database 222. The video shared content database 221 stores video shared content; such as, a trailer to an upcoming movie. Video shared content may serve the dual purpose of providing both visual and audio information to the user of the video sharing web site 270.

An audio shared content database 222 stores audio-only shared content. Audio-only shared content may contain audio-only information, or refer to shared content tailored to disseminate information primarily via audio (i.e. audio-only shared content may employ visual cues as well, such as banners or videos). Audio-only shared content may be in a form similar to a radio segment, for example. Audio-only shared content may rely on lesser resources to distribute, as bandwidth usually dedicated to video or click-through meta information may be avoided.

An implementer of system 200 may determine that a monetization amount associated with video shared content differs than that associated with audio-only shared content.

The playlist database 230 stores various playlists created by users on the video sharing web site 270, or by an automatic playlist generator. Video sharing web site 270 users may search for specific videos, and queue them for playing. While a user is viewing one video, the user may search for other videos to queue for future playing.

The video sharing web site 270 also may also employ an automatic playlist generator 235. The video sharing web site 270 may store a user's preferences. The video sharing web site 270 may create a playlist based on this knowledge. For example, if the video sharing web site 270 contains data that the user likes a specific artist, or genre, the automatic playlist generator 235 may populate a playlist with content similar to the specific artist or genre. The video sharing web site 270 may utilize the stored user preferences to generate the playlist via the automatic playlist generator 235. Alternatively, if the user has given express permission to do so, the system 200, via the automatic playlist generator 235, may track the user's browsing and consumption history, and create a playlist based on this information.

The playlist analyzer 240 receives a generated playlist from the playlist database 230. The playlist analyzer 240 may analyze the various items queued in the playlist. The playlist analyzer 240 may identify, using content-id, an original authorized content item associated with the various items queued in the playlist. For example, if the playlist has two videos queued, the playlist analyzer 240 may determine that the audio associated with both videos is sourced from the same artist or genre.

The playlist analyzer 240 also may determine an attribute of the user associated with the playlist. For example, if the playlist is associated with an artist whose primary audience is people over the age of 40, the playlist analyzer 240 may determine that the user is over the age of 40.

The playlist analyzer 240 also may determine whether the playlist is directed towards a user consuming the video and audio content of the individual media items, or merely just the audio associated with the content. The playlist analyzer 240 receives a playlist from the playlist database 230. The playlist analyzer 240 determines if the playlist is suitable for audio-only shared content. If the playlist analyzer 240 makes this determination, the playlist analyzer 240 sends the playlist to the shared content insertion unit 250, with the instruction to add audio-only shared content.

For example, the playlist analyzer 240 may accomplish this by determining that a certain percentage of the various items of the playlist are associated with a single artist, or music from a specific genre. Thus, if the playlist is populated primarily with videos associated with music, the playlist analyzer 240 may determine that the user is not actively viewing the videos associated with each item.

The playlist analyzer 240 may determine that the media item is primarily listened to, by determining that the motion in a video is under a threshold amount. For example, if the video is of a college professor presenting a lecture, and the college professor is primarily located in one spot, i.e. a podium, the playlist analyzer 240 may determine that the video is primarily audio in nature.

The playlist analyzer 240 may also determine that the media is primarily listened to by determining that a user is accessing the video sharing web site 270 with a mobile device. The playlist analyzer 240 may augment this determination by detecting that the user is moving, and thus determine that the user is utilizing the video sharing web site 270 as a source for primarily listened to content.

In addition to analyzing the playlist as a whole, the playlist analyzer 240 might analyze certain segments of the playlist as well. For example, if the playlist has 5 songs, the playlist analyzer 240 might ascertain that songs 1 and 2 are related to a similar topic, artist or genre. By locally analyzing segments of the playlist, the playlist analyzer 240 may determine shared content to be used as a transition between each item of a playlist. A pre-defined threshold for the number of songs falling within a specific category (i.e. genre, artist, theme) may be set for the purposes of analyzing the playlist.

Once the playlist analyzer 240 has ascertained certain aspects about the user, and how the user is consuming media from the video sharing web site 270, the playlist analyzer 240 may retrieve specific shared content from the shared content database 220. Thus, if the user is identified as over the age of 40, and an audio-only media consumer, the shared content database 220 may retrieve audio-only shared content for a user above the age of 40.

The shared content insertion unit 250 may insert shared content from the shared content database 240 within the playlist, such as in between two distinct media items belonging to the playlist. Relying on the example used above, if the playlist has 5 songs, and the playlist analyzer 240 determines that songs 1 and 2 are from a specific artist, the shared content insertion unit 250 may insert the shared content retrieved based on analysis performed by the playlist analyzer 240. For example, the advertisement insertion unit 250 may insert audio-only shared content for a concert related to the specific artist associated with songs 1 and 2.

The system 200 may deliver, via network 260, the playlist with shared content inserted, to the video sharing web site 270. A user, when accessing the video sharing web site 270, may select a playlist, and based on the playlist modified by system 200, experience the media associated with the playlist, with shared content embedded therein. Thus, if the user is consuming the playlist for the purposes of audio-only (or a majority of audio-only) consumption, the shared content insertion unit 250 may insert audio-only shared content in between various items in the playlist.

Figure 3:
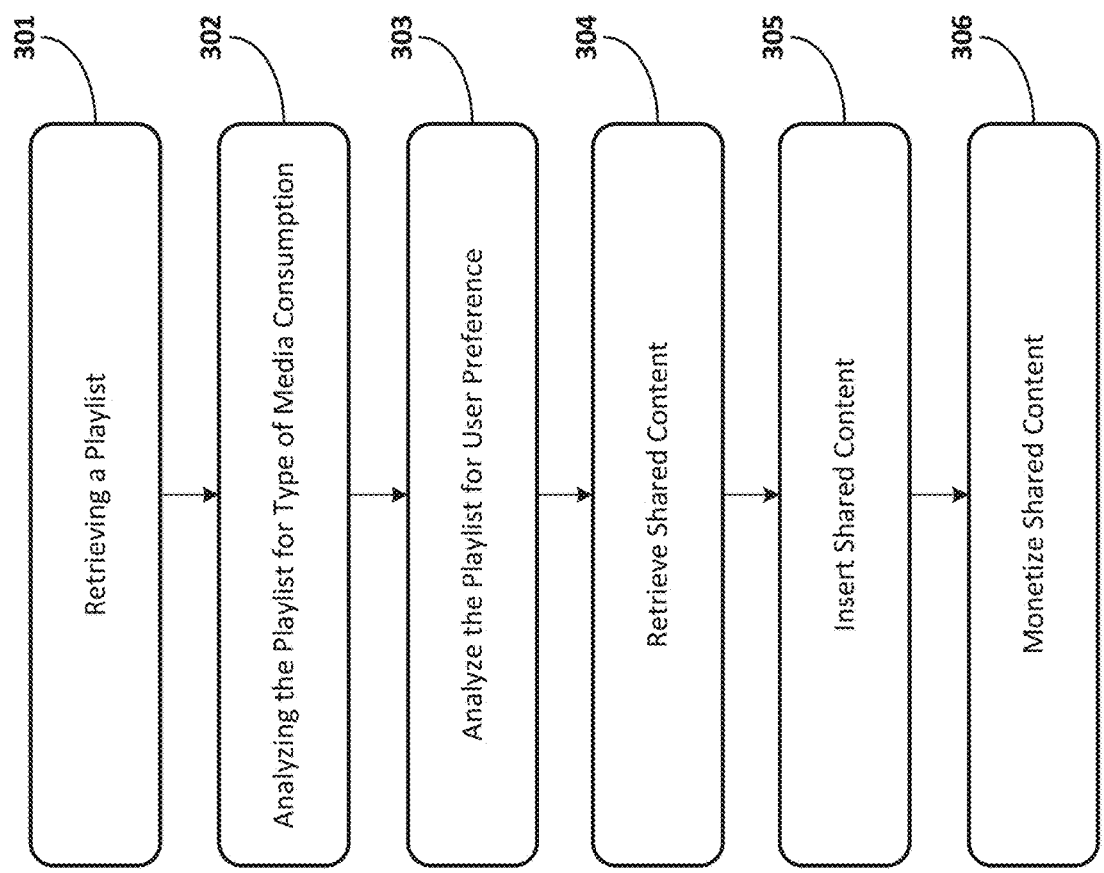
FIG. 3 illustrates a method for serving shared content on a video sharing web site via system of FIG. 2.

FIG. 3 illustrates a method for serving shared content on a video sharing web site via system 200.

In operation 301, a playlist is retrieved. The playlist may be user-created, automatically generated, or be a combination of both. The playlist may be automatically generated by the user's preference or browsing history.

In operation 302, the playlist is analyzed to determine the media consumption associated with content of the playlist. For example, the playlist may be analyzed to ascertain if the media will primarily be listened to or watched. One such technique is to ascertain whether the audio associated with the media of each item in the playlist is related through a common thread, such as being directed to the same artist, genre or theme. In operation 302, the system 200 may estimate the user is either a video and audio consumer, or an audio-only media consumer. In performing this analysis, the system 200 may employ content-id to determine the media's audio source. Thus, if a user is authorized to do so, and places a song from a popular artist over their video, the analysis of operation 301 may classify that the audio is sourced from the popular artist.

In operation 303, the playlist may also be analyzed to ascertain a user preference or attribute. For example, the playlist may be analyzed, and it may be determined that the playlist is directed towards media from an artist popular amongst users over the age of 40. Various other attributes may also be determined, such as artist preferences, musical genre preferences, and the like.

In operation 304, based on the playlist analysis performed in operations 302 and 303, the system 200 retrieves shared content. Thus, the system 200 may determine that the user is only listening to the media sourced from the video sharing web site 270. In this case, the system 200 may retrieve audio-only shared content. Conversely, if it appears as though the user is also actively watching the videos that constitute the playlist, the system 200 may insert video and audio shared content.

Additionally, based on the analysis performed in operation 303, the system 200 may determine shared content to include based on the user preference. Thus, if the system 200 determines that the media associated with the playlist is popular amongst users over the age of 40, shared content might be selected that describes goods or services that are ideally directed to users over the age of 40. In this way, by analyzing the playlist, and estimating the user's preference, shared content correlating to the user's preferences may be delivered to the user.

In operation 305, the shared content retrieved in operation 304 is inserted in between various items contained in the playlist. The shared content insertion may be localized within the playlists, i.e. if two items are directly on point to the shared content, the shared content may be inserted in between those two items. Based on the operations disclosed above, a user primarily listening to the media, while not viewing the associated video, may be delivered primarily audio-only shared content. Thus, effective shared content may be delivered to the user, while not wasting bandwidth on video shared content when a user is not viewing the videos.

In operation 306, an optional monetization operation may occur. The video sharing web site 270 may determine that media items that were used to determine the analysis may share in revenue generated from the insertion of the shared content. The video sharing web site 270 may determine that both the proceeding media item, as well as the succeeding media item may share in the revenue generated from audio-only shared content inserted in between both media items.

FIG. 4 illustrates an example transformation of a playlist according to the method described in FIG. 3.

Referring to a FIG. 4, an original playlist is shown, playlist 400. Playlist 400 has two media items, entry 410 'Beethoven's Symphony' and entry 420 'A wedding video using a Mozart piece as a background'.

In response to playlist 400 being selected by a user to play on a video sharing web site 270, the system 200 analyzes the playlist 400, and generates playlist 450. The system 200 analyzes that entry 410 and entry 420 are both directed to classical music. The system 200 may ascertain that entry 420 is directed to classical music by relying on content-id technology. As shown in playlist 450, an entry 415 'Shared Content for a Classical Music Concert' is inserted in between entry 410 and entry 420. The system 200 may also determine that the user playing playlist 400 is focused on the audio properties of the various media items contained in playlist 400. Thus, the system 200 may insert entry 415 as audio-only shared content.

Certain of the devices shown in FIG. 1 include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAMs) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to a flow chart and accompanying descriptions to illustrate the embodiments represented in FIG. 3. The disclosed devices, components, and systems contemplate using or implementing any suitable technique for performing the steps illustrated in these figures. Thus, FIG. 4 is for illustration purposes only and the described or similar steps may be performed at any appropriate time, including concurrently, individually, or in combination. In addition, many of the steps in these flow charts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on a tangible computer storage medium for execution by one or more processors. A computer storage medium can be, or can be included in, a computer-readable storage device, a computer-readable storage substrate, or a random or serial access memory. The computer storage medium can also be, or can be included in, one or more separate tangible components or media such as multiple CDs, disks, or other storage devices. The computer storage medium does not include a transitory signal.

As used herein, the term processor encompasses all kinds of apparatus, devices, and machines for processing data, including by way of example a programmable processor, a computer, a system on a chip, or multiple ones, or combinations, of the foregoing. The processor can include special purpose logic circuitry, e.g., an FPGA (field programmable gate array) or an ASIC (application-specific integrated circuit). The processor also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, module, engine, software, software application, script, or code) can be written in any form of programming language, including compiled or interpreted languages, declarative or procedural languages, and the program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

To provide for interaction with an individual, the herein disclosed embodiments can be implemented using an interactive display, such as a graphical user interface (GUI). Such GUI's may include interactive features such as pop-up or pull-down menus or lists, selection tabs, scannable features, and other features that can receive human inputs.

The computing system disclosed herein can include clients and servers. A client and server are generally remote from each other and typically interact through a communications network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

I claim:

1. A method comprising: receiving, by a processor, a playlist comprising information indicative of existing videos contained in the playlist, wherein the existing videos comprise audio content and video content served by a content sharing platform via a network; predicting, by the processor, whether relevant media content to be played by the content sharing platform is an audio-only media item or a video media item by determining that a mobile device is moving; and responsive to determining that the mobile device is moving, causing the audio-only media item to play on the mobile device rather than the video media item.

2. The method according to claim 1, further comprising evaluating a genre of at least one of the existing videos.

3. The method according to claim 1, further comprising evaluating a musical artist of at least one of the existing videos.

4. The method according to claim 1, further comprising determining whether at least one of the existing videos comprises audio-consumed media.

5. The method according to claim 1, wherein at least one of the existing videos is a user-created video.

6. The method according to claim 1, further comprising analyzing the existing videos to determine an associated user preference.

7. The method according to claim 1, further comprising monetizing the audio-only media item by sharing revenue with an owner of a preceding one of the existing videos and an owner of a succeeding one of the existing videos in which the audio-only media item is inserted between.

8. A system comprising: a memory; a processor, coupled to the memory, the processor configured to: receive a playlist comprising information indicative of existing videos contained in the playlist, wherein the existing videos comprise audio content and video content served by a content sharing platform via a network; predict whether relevant media content to be played by the content sharing platform is an audio-only media item or a video media item by determining whether a mobile device is moving; and responsive to determining that the mobile device is moving, causing, by the processor, the audio-only media item to play on the mobile device rather than the video media item.

9. The system according to claim 8, wherein the processor is further configured to evaluate a genre of at least one of the existing videos.

10. The system according to claim 8, wherein the processor is further configured to evaluate a musical artist of at least one of the existing videos.

11. The system according to claim 8, wherein the processor is further configured to determine whether at least one of the existing videos comprises audio-consumed media.

12. The system according to claim 8, wherein at least one of the existing videos is a user-created video.

13. The system according to claim 8, wherein the processor is further configured to analyze the existing videos to determine an associated user preference.

14. The system of claim 8, wherein the processor is further configured to analyze a visual cue in at least one existing video on the playlist.

15. The system of claim 8, wherein the processor is further configured to determine whether at least one existing video comprises a banner.

16. The system of claim 8, wherein the processor is further configured to determine that at least one existing video on the playlist includes a user-added song over video.

17. A non-transitory computer-readable storage medium storing instructions that, when executed by a processing device, cause the processing device to perform a method comprising: receiving a playlist comprising information indicative of existing videos contained in the playlist, wherein the existing videos comprise audio content and video content served by a content sharing platform via a network; predicting whether relevant media content to be played by the content sharing platform is an audio-only media item or a video media item by determining whether a mobile device is moving; and responsive to determining that the mobile device is moving, causing the audio-only media item to play on the mobile device rather than the video media item.

18. The non-transitory computer-readable storage medium of claim 17, the method further comprising evaluating a genre of at least one of the existing videos.

19. The non-transitory computer-readable storage medium of claim 17, the method further comprising evaluating a musical artist of at least one of the existing videos.

* * * * *